Feb. 18, 1947.  H. K. DERBY  2,415,995
METHOD OF MAKING DEHYDRATED FRUITS AND VEGETABLES
Filed Aug. 14, 1943
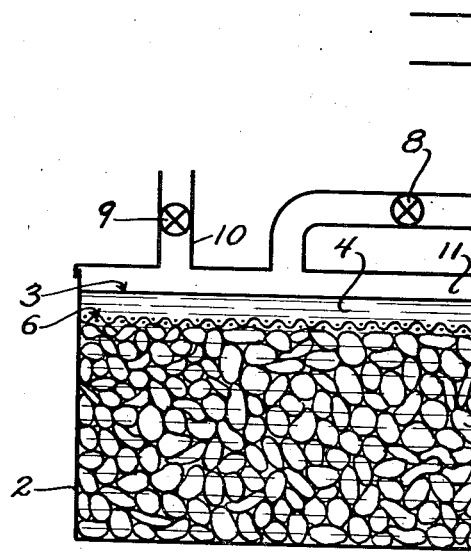
INVENTOR,
HAROLD K. DERBY.
BY Charles M. Fryer
ATTORNEY.

Patented Feb. 18, 1947

2,415,995

UNITED STATES PATENT OFFICE 2,415,995

METHOD OF MAKING DEHYDRATED FRUITS AND VEGETABLES

Harold K. Derby, Berkeley, Calif., assignor to F. E. Booth Company, Inc., San Francisco, Calif., a corporation of Nevada Application August 14, 1943, Serial No. 498,665

4 Claims. (Cl. 99—204)

This invention relates to improvements in dehydrating foodstuffs and the resulting products.

In the treatment of vegetables on an industrial scale to obtain them in dried or dehydrated condition, it has been the universal custom, in addition to cleaning and perhaps cutting the vegetables into sections, to blanch the material before dehydrating it. Blanching involves treatment with steam or hot water, generally at about the temperature of boiling, and the blanching is continued long enough to inactivate the enzymes naturally present for the purpose of improving the appearance and the keeping qualities of the products. It amounts to at least a mild cooking, and if the material is in small pieces, it amounts to a somewhat greater degree of cooking. It destroys the cellular tissue and permits the fluid cell contents to bleed out of the cells. Thus, substances which have high nutritive value, and substances which have the ability to enhance the keeping qualities of the material, for example, minerals, sugars, vitamins, and the like, bleed out of the cells and are exposed to the air. This results in losses. Vitamin losses also generally occur in the subsequent steps of the drying or dehydrating processes. Prior processors on an industrial scale have for some time considered blanching an essential preliminary step to the drying or dehydration of vegetables. They have attempted by blanching to preserve as much of the original nutritive values, taste and appearance as possible, and to inactivate certain enzymes which cause oxidation, discoloration, loss of flavor, off odors and the like; but this has inevitably been accomplished by more or less loss of vitamins, and has resulted in considerable differences in taste and appearance of the products.

The treatment of fruits and some vegetables with sulphur dioxide in the free or combined state has preserved the vitamin potency to a great extent, particularly that of vitamin C or cevitamic acid, but it has destroyed the thiamin and possibly some other vitamins present. It has maintained, to some extent at least, the original light appearance and has usually prevented much darkening, and it has helped to make the material translucent, particularly in the case of apricots, peaches, and the like.

Objects of this invention are to provide improved dehydrated products which are better in appearance and taste, and have or retain a higher vitamin content and nutritive value than prior products before and after dehydration; to provide processes without the necessity for using complicated and expensive vacuum dehydrating apparatus to produce such products; to provide better and simpler dehydrating processes than heretofore, which are easy and economical to operate, which avoid the necessity for blanching and which avoid the necessity for treatment with sulphur dioxide; and other objects will become apparent on reading this specification.

This invention, broadly stated, comprises dehydration with the intercellular air replaced by aqueous or other material which is all, or almost all, dissipated by the dehydration step, and more specific features will appear hereafter.

The figure of the accompanying drawing is a diagrammatic view illustrating the preferred process of removing the air and other gases which may be present within the material and hereinafter referred to broadly as "air," and maintaining the interior of the material free of air even when it is exposed to the atmosphere. The preferred manner of dehydrating the material without the presence of the air normally present within it generally in the spaces between the cells, is to replace such air with liquid. The preferred manner of accomplishing this is to submerge the fruits or vegetables or slices or pieces thereof 1 in a container 2 under the level 3 of water 4 therein, seal the container, and apply sufficient suction, as by means of an aspirator 5 or in any other suitable manner to the interior of the container to cause the air within the fruit or vegetable or pieces thereof to expand to such an extent as to leave the interior and enter the water. Aspirators and other vacuum producing devices easily obtainable are very effective in quickly producing a very high degree of vacuum so that it is easily possible to remove in a relatively short time practically all of the air present within the material. The more thorough the removal of air the better.

When practically all of the air has been removed, the vacuum is broken with the material covered with water and remaining thereunder until the water has filled the spaces originally occupied by the air. It should ordinarily be allowed to stand under the liquid for a substantial period of time after breaking the vacuum, to permit rather complete impregnation of the material by the liquid, since the capillary passages in the material through which the water can flow are small. The duration of standing for impregnation can be shortened by applying pressure greater than atmospheric to the interior of the container. In practice, a five (5) to ten (10) minute evacuation period after attaining a high degree of vacuum, for example corresponding to a pressure of less than one (1) inch of mercury, followed by a five (5) minute impregnation period at atmospheric pressure after release of the vacuum has been found sufficient, in the case of slices or pieces of about the size in which similar material is ordinarily dried. The material should be under the surface of the liquid at the time the vacuum is broken, and thereafter until permeation is completed. With this in view, a screen 6 or other means is used to hold the material below the surface 3 if the material has a tendency to float. The vacuum may be broken by shutting off the flow of water through the aspirator 5 by closing the valve 7, with the valve 8 in the connection between the suction end of the aspirator and the container open. It may also be broken by opening the valve 9 to open the container to the atmosphere, with the valve 8 either open or closed. The valve 9 may be in the pipe 10 which may be connected to a source (not shown) of compressed air, or other fluid, if superatmospheric pressure is to be used. An alternative procedure is to evacuate the air without having the material submerged in the liquid, then submerge the material in the liquid, and then break the vacuum. Or, the evacuation may occur without liquid in the container 2, and the vacuum may be broken by closing the valve 8 while the aspirator is in operation, and opening the valve 9 with the pipe 10 connected to a source (not shown) of the liquid with which the material is to be treated. If desired, this liquid may be under considerable pressure, and upon filling the container therewith such pressure may be applied to the impregnation step. The air space 11 present in the container should be at a minimum consistent with easy operation, since too large an air space in the container may require a longer time than that indicated above for sufficient evacuation of the air. Lower degrees of vacuum for correspondingly longer periods of time may accomplish the same purpose.

Fruits and vegetables are composed of cells which form intercellular spaces of capillary size between them, which form a more or less interconnecting system of passageways within the plant material. The degree of replacement of the air in the interconnected passageways by the liquid may be checked by removing samples, making a cross section thereof and examining the section surfaces with the naked eye. Material which has been thoroughly impregnated with the liquid presents a section surface which has a translucent appearance, while less thoroughly impregnated material presents a section surface which has more or less, depending on the degree of impregnation, of the opaque appearance presented by the section surface of the original material. The duration of the vacuum treatment required may vary for different sizes of material and perhaps also for different kinds of material.

The material is subjected to the dehydrating step with the air in the spaces between the cells replaced. The replacement of the intercellular air and the steps of evacuation and impregnation by which it is accomplished are generally preferred to be at room temperature because this avoids the necessity of apparatus for heating or cooling and for controlling temperature, and it avoids any damaging effect of temperature changes on the fruits and vegetables. There may, however, be special cases where temperature changes are desirable. Raising the temperature causes expansion of the air within the material, as does the application of the vacuum, and thus the efficiency of attenuation of the air present may be increased. The period of time required at room temperature is, however, so short that the expense and other undesirable factors incident to heating may generally be avoided.

Material in which the intercellular air is replaced by water or water solutions apparently can be dried or dehydrated more easily and quickly, in spite of the fact that it contains more water, than test material of the same kind containing its intercellular air. Replacement of the intercellular air with water thus seems to aid the drying or dehydrating step. This may be due perhaps to better heat conducting properties of water than of air and the continuous liquid phase permitting rapid capillary action.

Thus, all that is needed to convert raw fruits and vegetables into high quality dehydrated products, having the desired appearance and increased vitamin values, is to replace the intercellular air with a suitable liquid and then dehydrate or dry the resulting material. Blanching and/or sulphuring become unnecessary with such treatment and can be omitted. The dehydration step may be performed in any conventional or other suitable manner, and if desired by any conventional or other suitable apparatus.

It has been the custom to cut peaches, apricots and pears for example into half sections, and apples for example into smaller sections. The custom of cutting any fruits or vegetables into sections may be and is preferably continued, but need not necessarily be, in dehydrating according to this invention.

Another important feature of the invention is the replacement of the air in the material with a material which is inert or does no harm to the desirable components and characteristics of the material. Carbon dioxide, or nitrogen, or other desired gas, can be used to break the vacuum within the container after sufficient air has been removed from the material, as by closing the valve 8 and then opening the valve 9, with the pipe 10 connected to a suitable source of supply (not shown). Other suitable liquids which can be evaporated or dissipated by the dehydrating step may be used instead of water. Such other liquids as well as water, may, if desired, contain useful substances dispersed therein. Water is preferred because it is the most available and economical, and is easy to use, either alone, or, as often is the case, as a solvent for different materials which can serve various purposes.

Dehydrated raw white or Irish potatoes now being made by prior methods are in segments which are hard and translucent and have somewhat the horny appearance of dried glue. Those made according to the present invention are more granular and friable. Comparing them by eating them in dehydrated condition, it is found that the old type are harder to break up and harder to chew than the new type and the new has more of the potato flavor than the old. But white potatoes sliced and treated, according to the present invention, with water alone become slightly discolored and assume a pinkish gray appearance. If ascorbic or isoascorbic acid and ordinary starch be added in solution in the water, however, the natural color remains on the finished product. The starch does not appear to penetrate very deeply but to form more of a surface coating, perhaps because it forms a colloidal solution in the impregnating water. However, the natural color remains throughout the slices. Sugars are also useful. The starch and sugar solutions need not be of any particular strength, but five to fifteen percent (5 to 15%) solutions are easily made and are useful. The starch and the sugar are expediently dissolved in the same impregnating water to treat with both simultaneously, thus impregnating with the sugar and coating with the starch. An aqueous solution containing about seven per cent (7%) of the starch and a like amount of the sugar is effective.

Citric acid has been used to treat sweet potatoes prior to dehydrating them, because they otherwise become discolored in the dehydration step. The original color of the sweet potato is largely retained when they are treated with a sugar solution according to this invention and without the use of the citric acid.

Pears and apples dehydrated by the new process taste better, and have more of the natural fresh pear or apple flavor than those prepared by the old process. The novel procedure is also applicable to peaches and apricots.

It is possible to produce, with the aid of this invention, a better appearing and more tasty food product from poorer raw material than was previously possible from better raw material, and material having naturally a poor or insufficient flavor can be given a better or increased flavor. For example, apples differ in flavor by reason of containing different proportions and combinations of various acids, esters, aldehydes, and perhaps other flavoring materials. Such flavoring materials and the amounts thereof in various types of apples are known, or can be determined by chemical analysis. The proper amounts of different flavoring materials can be added to apples having naturally a poorer or insufficient flavor while they are being subjected to the treatment according to this invention. The dehydrated product then not only has the desirable characteristics as a result of the novel process, but it also has more of a true apple flavor than more highly flavored apples dehydrated by prior processes. The flavoring materials to be added need only to be suitably dissolved or dispersed in the impregnating water or whatever may be used for impregnating. Thus, if desired, a standard or other controlled taste can be imparted to dehydrated apples, and other materials also, even to material which was not suitable to be used as a dehydrated product due to its flavor or lack of it. The pH or hydrogen ion concentration of the material to be dehydrated affects qualities of the product. For example, apple juice normally has a pH of about four (4), and such apples rehydrate very well after dehydration, especially if dehydrated according to this invention. When the juice of apple material has a pH of substantially more than about four (4), the material may be treated with the proper quantity of malic, tartaric, citric, phosphoric, hydrochloric, or perhaps other acid to reduce the pH to about four (4). Treatment of fruit with acid solution according to this invention tends to increase translucency in the dehydrated product.

Sometimes the flavor can be enhanced without the addition of the acid, ester and aldehyde flavoring materials normally present in apples. For example, Winesap apples having weak flavor, with the intercellular air thereof replaced by a solution of equal parts by weight of sucrose and water and then dehydrated, had a much more marked pleasant apple flavor than before the treatment. The use of sugar solutions tends to develop or accentuate the flavor of the particular fruit treated. Stronger solutions are generally more effective than weaker ones. By this method enough sugar can be added so that none need be added for cooking purposes.

Fresh pineapple, not quite ripe, has been peeled and sliced to the thickness of about one-fourth (¼) of an inch, the air normally present between the cells thereof replaced with a solution of one part by weight of sucrose to two parts of water, and then dehydrated. Similar slices were similarly treated with a solution of one part of corn sugar (dextrose) to three parts of water by weight. Slices so impregnated were dehydrated at a temperature of one hundred degrees Fahrenheit (100° F.). Higher temperatures may cause the slices to turn brown and those treated with the dextrose turn brown more easily than those treated with the sucrose. Another batch of similar slices was treated with a stronger syrup consisting of equal parts by weight of sucrose and water, and the slices were then dehydrated at one hundred fifteen degrees Fahrenheit (115° F.). This product also had a good color and flavor, but the sugar crystallized, which may be prevented by replacing some of the sucrose with dextrose which imparts a glaze to the product and prevents crystallization of the sucrose. The exact amount of sugar needed may vary somewhat with the characteristics of the pineapple. Following impregnation with a sugar solution, bromelin, a proteolytic enzyme, which causes a sharp burning sensation when fresh pineapple is eaten, is rapidly inactivated so that its taste and sensation is not apparent in the dehydrated product, although the true pineapple flavor was developed or accentuated.

Firm ripe peaches have been sliced to a thickness of about three-eighths (⅜) of an inch and these impregnated with a heavy syrup consisting of two parts by weight of sugar to one part of water, the sugar consisting of seventy-five percent (75%) of sucrose and twenty-five percent (25%) of dextrose. After dehydration the slices were translucent and retained the attractive red color in the part next to the pit. Such a proportion of the sugars in such a syrup prevents crystallization. The product may be eaten as such as a fruit confection, and judging by the flavor thereof, at least a part of the sugar seems to have been changed into an acid, affording a pleasing tart taste. The flavor and appearance are excellent. When cooked by dropping the dehydrated slices into hot water and boiling for not more than ten (10) minutes, the cooked product can scarcely be distinguished from cooked fresh peaches. The cooked product is very tender so that care must be observed not to overcook. On reconstituting the dehydrated slices impregnated with the sugar, a product results which is similar in appearance, flavor and odor to the fresh peach. Prolonged soaking in water should be avoided, as this may cause darkening or browning. Peaches may be sulphited by impregnation according to this invention with a solution of sodium sulphite in water of about two percent (2%) strength whereupon they may be dehydrated.

Dehydrated tomatoes have heretofore been prepared by grinding them to a juice or paste condition and dehydrating them in this condition. Such grinding causes a considerable loss in vitamin C. There is also further loss thereof on dehydration by old methods. There is a saving in vitamin C by dehydrating tomatoes according to the present invention. There is a very substantial additional saving of the vitamin C potency of tomatoes by omitting the grinding, and treating the tomatoes whole in the container 2 with water. Tomatoes ordinarily float in the water. Air passes out of the stem ends thereof under the influence of the vacuum, forming bubbles if such part of the tomato is under the surface of the water. It is a simple matter to hold the tomatoes under the surface if desired, but if the air is evacuated from the whole tomato, it automatically sinks below the surface on release of the vacuum. When the air has been evacuated and the water has taken its place inside the tomatoes, they, like the other materials heretofore mentioned, can be dried or dehydrated by any suitable process or means. The tomatoes may, however, be cut into halves or quarters before subjecting them to the treatment in order to hasten the dehydrating step. Spinach, cabbage, lettuce and other leaf vegetables may be treated according to this invention and have at least as good and even a better flavor than when dehydrated according to prior methods.

Desired substances can be added to the impregnating water or other liquid. Dextrose is the preferred sugar for impregnating the material, but levulose, sucrose, lactose, and other sugars may be used. Coloring matter may be added to obtain a particular color or shade. Potassium iodide changes the character of the pigment in peaches, apricots and tomatoes and can be added in the treatment thereof, not only to produce a color change but to supply the necessary iodine ration. Sodium glutamate or other protein hydrolysate, salt or other condiments may be used, particularly in the treatment of vegetables which may be used later in soups, since the hydrolysates supply the meat stock flavor to the soups so that a tasty soup results from merely cooking the dehydrated vegetables containing the hydrolysate. Enzyme preparations can be added if desired, such as those which tenderize the material, stabilize the color thereof, hydrolyze the proteins, sugars or starches, or perform some other function, as can vitamins, calcium, chloride or other inorganic or organic salts or any other desired material compatible with the material being treated. The particular material or materials to be used will depend on the particular flavor to be imparted or other results desired. The material may be impregnated with the juice of the same kind of fruit or vegetable to increase the flavor, or even with the juice of other material. It may also be impregnated with a solution of sodium sulphite or bisulphite or metabisulphite in water, which accomplishes sulphuring simultaneously with impregnation. This affords a good control of the sulphuring operation. A two per cent (2%) solution is effective, but the strength may be varied to a great degree.

Products made according to this invention look better and taste better than prior products if eaten while still in dehydrated condition or if first rehydrated. The new products also retain a greater proportion of the original vitamin potency including vitamin C than prior products. The new products assume on rehydration a condition much closer to the original condition than do prior products. Dehydrated tomatoes prepared by prior methods cannot again assume their original appearance, but those prepared according to the present invention will. Enzymes originally present in the materials have always caused deterioration of the color of prior products unless they were inactivated by the blanching treatment which was therefore a necessary one. The original color remains if the material is prepared according to the present invention, even without using the blanching treatment. Blanching ruptures the cell walls and permits bleeding out of the vitamins and other cell contents, replacing them with steam or water. Air thus had access to the vitamins and air has a destructive effect on them. The present invention maintains the cell walls intact and the vitamins and other cell contents within the intact cells, and prevents access of air thereto. Cell contents are also protected by the protective coating of sugar on the outside of the cell walls which is important since vitamin C and perhaps others can pass in solution through the membrane of the cell walls. By having material dissolved in the impregnating liquid, particularly material having large molecules such as sugars and starch, equilibrium of osmotic pressure is set up on both sides of the cell walls which lessens any tendency due to osmotic pressure of material within the cells to pass through the walls to the outside thereof. Another great advantage of the present invention is that none of the treatment steps preceding the actual drying or dehydration step need be at elevated or at any temperature other than normal or room temperature, although a different temperature may become desirable under special circumstances. An example of the desirability of a higher temperature is when autolysis is desired previously to the dehydration step. The invention is applicable to the treatment of white potatoes, sweet potatoes, apples, pears, peaches, apricots, figs, plums, prunes, pineapple, strawberries, tomatoes, spinach, cabbage, lettuce, and many other vegetables and deciduous and citrus fruits.

Instead of proceeding as above described, fruit or vegetable material may be ground, blended with other ground fruit or vegetable material if desired, impregnated with syrup or other solution or liquid, strained or centrifuged, and then dehydrated. Also the material dehydrated in whole or piece form may be ground after dehydration.

Some distinction has been made in the art between the terms "dry" and "dehydrate," and their derivatives, as applied to fruits and vegetables. The term "dry" has ben applied to drying in the sun or other slow drying. The term "dehydrate" has been applied to the forced removal of the water present, as by a current of hot air; and vacuum dehydration has been used, but this necessitates more complicated and more expensive apparatus due largely to the difficulties of heat transfer in a vacuum. Heat in some form is always used in the commercial removal of the water from fruits and vegetables. The invention is useful whether the step of removing the water be by "drying" or by "dehydrating"; the distinction between the terms has not always been adhered to since they are sometimes used interchangeably; and it is intended that the term "dehydrate" and its derivatives as used in the appended claims shall cover generically the removal of water.

Certain details have been referred to for the purpose of illustration, which may be varied without departing from the invention.

I claim:

1. The method of preparing dehydrated fruit and vegetable material which comprises utilizing pieces of the material having its cell walls substantially intact, replacing substantially all of the air in the material by a vacuum treatment and prior to dehydration thereof, with a water containing liquid while maintaining the cell walls of the material substantially intact, and subsequently dehydrating such material.

2. The method of preparing dehydrated fruit and vegetable material which comprises utilizing pieces of the material having its cell walls substantially intact, immersing the material in a water containing liquid, subjecting the liquid with the material therein while maintaining said cell walls substantially intact, to a pressure below atmospheric pressure to withdraw substantially all of the air from the material prior to dehydration thereof, breaking the resulting vacuum after substantially all the air has been withdrawn from the material, allowing the material to remain immersed in the liquid after such vacuum has been broken to cause substantially complete impregnation of the liquid in the spaces from which the air has been withdrawn, and subsequently dehydrating the material.

3. The method of preparing dehydrated fruit and vegetable material which comprises utilizing pieces of the material in unblanched condition and having its cell walls substantially intact; prior to dehydration of the material and while said cell walls are thus substantially intact, subjecting the material to a vacuum treatment for removing substantially all of the air therefrom and replacing said air with a water containing liquid to provide a substantially continuous phase of the liquid in the material; and after substantially all of the air has been thus removed and replaced with the liquid, dehydrating the material.

4. The method of preparing dehydrated fruit and vegetable material which comprises utilizing pieces of the material in unblanched condition and having its cell walls substantially intact; prior to dehydration of the material and while said cell walls are thus substantially intact, subjecting the material to a vacuum treatment at substantially room temperature for removing substantially all of the air therefrom and replacing said air with a water containing liquid to provide a substantially continuous phase of the liquid in the material; and after substantially all of the air has been thus removed and replaced with the liquid, dehydrating the material.

HAROLD K. DERBY.

REFERENCES CITED

The following references are of record in the file of this patent:

UNITED STATES PATENTS

| Number | Name | Date |
| --- | --- | --- |
| 1,996,395 | Arnold | Apr. 2, 1935 |
| 1,944,265 | Pilorz | Jan. 23, 1934 |
| 2,066,574 | Pilorz | Jan. 5, 1937 |
| 2,341,152 | Moskovitz | Feb. 8, 1944 |
| 1,890,475 | Todd | Dec. 13, 1932 |
| 1,387,710 | Harrison | Aug. 16, 1921 |
| 2,084,956 | Hessel | June 22, 1937 |
| 2,037,009 | Cowgill | Apr. 14, 1936 |
| 2,094,314 | Wiggins | Sept. 28, 1937 |